United States Patent Office 3,478,844
Patented Nov. 18, 1969

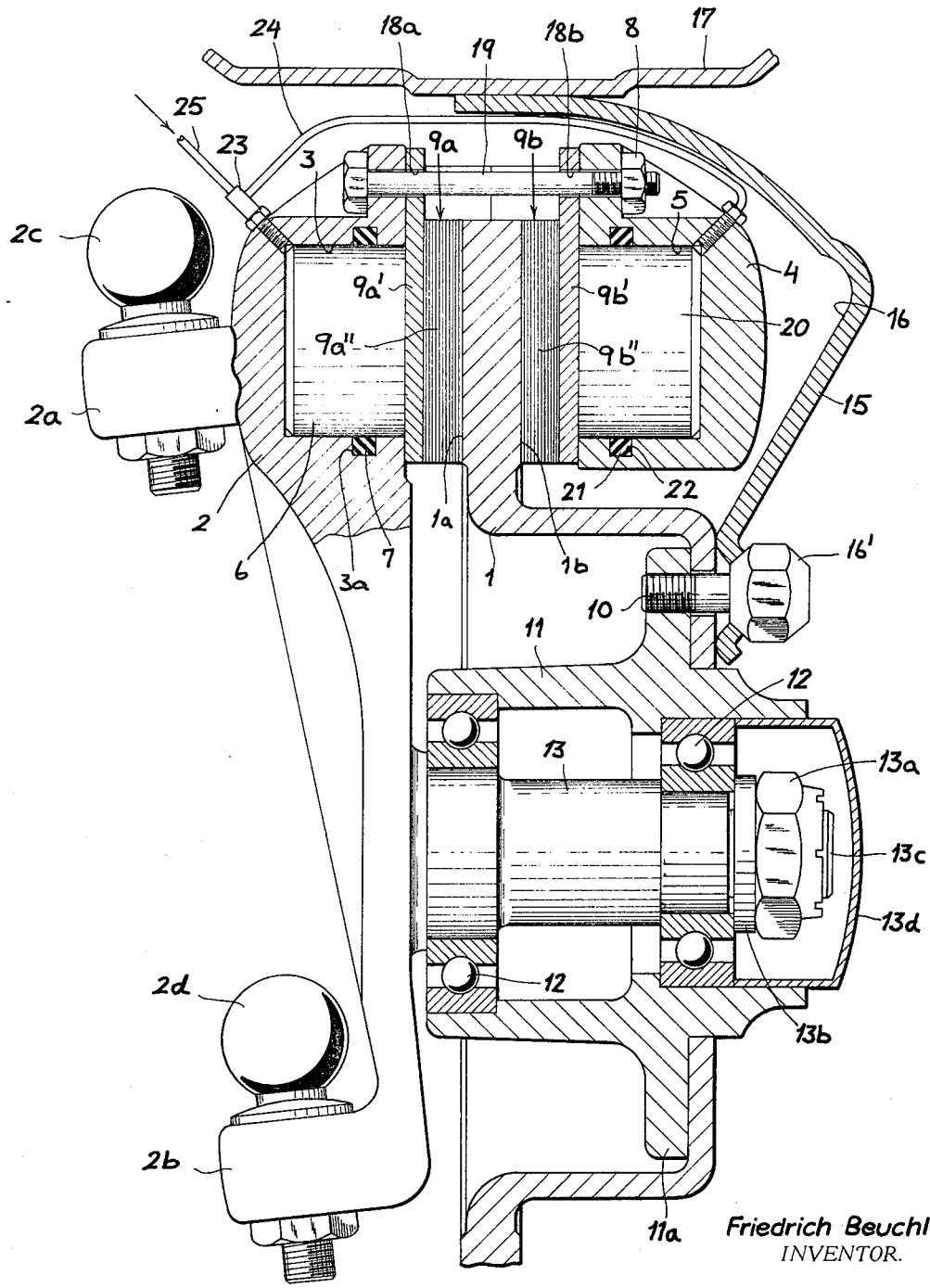

3,478,844
FIXED-YOKE DISK BRAKE
Friedrich Beuchle, Frankfurt am Main, Germany, assignor to Alfred Teves GmbH, Frankfurt am Main, Germany, a corporation of Germany
Filed Jan. 10, 1968, Ser. No. 696,805
Claims priority, application Germany, Jan. 20, 1967,
T 33,028
Int. Cl. B60t 1/06; F16d 55/228
U.S. Cl. 188—18                        2 Claims

ABSTRACT OF THE DISCLOSURE

A fixed-yoke disk brake in which a pair of yoke halves flank opposite faces of the brake disk which is fixed to the tire-carrying wheel disk, preferably of a steerable vehicle wheel, and are formed with wheel-brake cylinders receiving respective pistons which displace brakeshoes against opposite annular faces of the disk, one yoke half being formed unitarily (i.e. in a single monolithic piece) with a nonrotatable portion of the vehicle body of preferably, the axle-carrying steering knuckle of the wheel.

---

My present invention relates to a fixed-yoke disk brake, and more particularly, a disk brake for a steerable wheel of an automotive vehicle.

Disk-type brakes have gained increasing prominence in recent years as a result of their improved response, the low volume of fluid which must be displaced by the master cylinder to actuate them, and the rapidity with which they are able to bring a vehicle to standstill. In general, a spot-type disk brake for automotive-vehicle application, comprises a brake disk which is rotatably entrained with a wheel of the vehicle, e.g. by being mounted upon the tire-carrying wheel disk or upon the axle shaft of a wheel, and a brake housing in the form of a U-shaped yoke extending around the periphery of the disk and connected with a relatively stationary part of the vehicle structure. This part may be an axle housing, some other portion of the suspended chassis or the vehicle body or chassis itself. The yoke, which may be axially shiftable in a direction perpendicular to the opposite annular braking faces of the disk or may be fixed with respect to movement in this direction, is provided with a pair of brakeshoes confronting the respective braking faces and thus flanking the disk while being movable perpendicularly to these braking faces and parallel to the axis of rotation of the disk. Such movement may be independent of movement of the brake yoke or may be a consequence of the axial movement thereof. To actuate the brakeshoes, one or more wheel-brake cylinders can be provided in the brake yoke with corresponding pistons individual to the brakeshoes and adapted to bear directly against the latter to apply the brakeshoes to the disk. The brakeshoes are dimensioned to occupy only a minor segment of the total annular extent of the respective braking face and thus may be considered as segmental or spot-type brakeshoes by contrast with other disk-brake systems in which annular brakeshoes may be employed. The hydraulic fluid necessary to supply the wheel-brake cylinders is delivered by a master cylinder actuated by the brake pedal. In some cases, only a single wheel-brake cylinder is provided, this cylinder receiving a piston which bears against one of the brakeshoes to urge the latter directly against the disk and thus bears upon this brakeshoe.

The instant invention is directed to improvements in fixed-yoke brakes of the aforedescribed type. In general, the bipartite yoke, which is composed of a pair of yoke halves (each forming a respective wheel-brake cylinder), is connected to a nonrotatable part of the vehicle body by bolts or the like, this nonrotatable portion being formed with lugs, flanges or the like to accommodate the screws. After the inner yoke half is attached to the nonrotatable support, the disk is positioned appropriately and the second, or outer yoke half is bolted in place. The "inner" yoke half, of course, lies inwardly on the disk with respect to the outline of the vehicle, while the "outer" yoke half is generally received within a concavity formed in the dished tire-carrying wheel disk. These conventional methods of mounting the flanged inner yoke half on the vehicle have the disadvantage that the additional parts mentioned earlier are required for proper support and to accommodate the bolts. These parts have a tendency to shift and often change the position of the attaching screws of the brake housing. If such shifting occurs after the brake housing is in place, the effectiveness of brake operation is markedly reduced.

It is, therefore, the principal object of the present invention to provide an improved disk brake assembly of the fixed-yoke type for automotive vehicles.

Another object of this invention is to obviate the disadvantages of the earlier systems which required special mounting parts to provide a support arrangement for the brake which will eliminate movement of the brake yoke and reduced braking effectiveness.

I have found that these objects may be attained in a convenient and effective manner when one of the yoke halves, preferably the "inner" yoke half, is formed integrally and unitarily (i.e. monolithically in a single piece) with a nonrotatable portion of the vehicle adjacent the rotatable brake disk which is locked to the shaft of the wheel. The present invention is applicable both to rear wheel assemblies, in which the nonrotatable portion of the vehicle may be the axle housing extending from the differential of the drive train, and to steerable front wheel assemblies in which the nonrotatable part is the axle-carrying steerable support of the tire-supporting disk. Preferably, however, the invention is applied to the steerable wheels of the vehicle and the inner yoke half is formed unitarily with the steering knuckle to which the steering linkage (e.g. pitman, steering arms and tierods) are pivotally connected, the associated wheel-brake cylinder being formed directly in the steering knuckle in this case.

The above and other objects, features and advantages of the present invention will become more readily apparent from the following description, reference being made to the accompanying drawing, in which the sole figure is an axial cross-sectional view through a portion of a wheel brake embodying the present invention.

In the drawing I show a steerable front wheel assembly for an automotive vehicle in which the steering knuckle 2 is provided with lugs 2a and 2b having ball joints 2c and and 2d of conventional construction respectively connecting the steering knuckle to the steering arms and/or the tierods of the steering linkage (see Principles of Automotive Vehicles, U.S. Government Printing Office, Washington, D.C., 1956, pp. 402 ff.) and to the cross beam supporting the steering knuckles. A stud shaft or spindle 13 carries the wheel hub 11 via a pair of axially spaced wheel bearings 12 which are retained by the nut 13a and a washer 13b threaded unto the end 13c of the spindle 13. A sheet metal packing cap 13d covers the nut to prevent contaminants from entering the grease-packed wheel bearings 12. The hub 11 is provided with double-ended bolts 10 at angularly equispaced locations in a radial flange 11a to which the brake disk 1 and the wheel disk 15 are affixed via the locking nuts 16'. The wheel disk 15 is concave inwardly at 16 to accommodate the cantilevered outer yoke half 4 and carries the rim 17 in which the tire is seated. The disk 1 is formed with a pair of annular braking faces 1a and 1b respectively engageable by brakeshoes 9a and 9b, each having a backing plate 9a', 9b' to which the brake linings 9a", 9b" are bonded. Apertures 18a and 18b in the backing plates suspend the brakeshoes from a pair of tension bolts 19 which span the yoke assembly and attach the outer yoke half 4 to the steering knuckle 2 which forms unitarily the inner yoke half. Nuts 8 hold the yoke halves 2, 4 together.

The steering knuckle and the inner yoke half 2 is provided directly (e.g. by casting and subsequent boring) with a wheel brake cylinder 3 and an inner peripheral groove 3a in which a sealing ring 7 is recessed. The wheel brake piston 6 is axially shiftable in the cylinder 3 to urge the brakeshoe 9a against the inner surface 1a of the disk. Another cylinder 5 is formed in the outer yoke half 4 and slidably receives a piston 20 which acts against the brakeshoe 9b in the opposite axial direction. An annular recess 21 is provided in the cylinder wall and receives the sealing ring 22. Hydraulic fluid is supplied to cylinder 3 via a fitting 23 from the master cylinder of the brake system and is delivered simultaneously to the cylinder 4 via a rigid tube 24. A flexible high pressure conduit, forming part of the brake fluid transmission network, may be attached at 25 to the fitting 23. This fixed-yoke brake operates as previously described to restrict rotation, upon actuation of the master cylinder by the brake pedal of the disk 1 and the wheel 15–17 etc. relatively to the steering knuckle 2 and its shaft 13.

The invention described and illustrated is believed to admit of many modifications within the ability of persons skilled in the art.

I claim:

1. A fixed-yoke spot-type disk-brake system for an automotive vehicle having a steering wheel, said system comprising:
    a steering knuckle pivotal about a substantially upright axis and formed with a generally horizontal axle extending outwardly with respect to the vehicle;
    a hub rotatably mounted on said axle;
    a brake disk fixed to said hub and rotatable therewith while having a first annular brake surface confronting and parallel to said knuckle, and a second annular brake surface turned away from said knuckle;
    an inwardly concave tire-carrying wheel disk mounted on said hub and overhanging said brake disk for at least partly enclosing same;
    a spot-type brake yoke on said knuckle, including a yoke half received in said wheel disk and confronting said other surface of said brake disk opposite a portion of said knuckle, said yoke half being affixed to said steering knuckle, a wheel-brake cylinder unitarily formed in the material of said steering knuckle and said yoke half being provided with a second wheel-brake cylinder in alignment therewith along an axis parallel to the axis of said axle and opening in the direction of said brake disk;
    a respective wheel-brake piston slidably received in each of said cylinders and hydraulically displaceable therein;
    respective spot-type brakeshoes between each of said pistons and the corresponding surface of said brake disk for frictional engagement with the latter upon hydraulic displacement of said pistons; and
    means for supplying brake fluid to said cylinders to clamp said brake disk between said brakeshoes.

2. A system as defined in claim 1 wherein said brake yoke includes bolt means outwardly of said brake disk and supporting said yoke half on said knuckle, said bolt means extending parallel to the axis of said axle and transversely of said surfaces while slidably carrying said brakeshoes.

References Cited

UNITED STATES PATENTS

| | | | |
|---|---|---|---|
| 2,816,630 | 12/1957 | Kelley et al. | 188—18 |
| 3,183,999 | 5/1965 | Buyze et al. | 188—18 |
| 3,384,203 | 5/1968 | Walther et al. | 188—73 |

FOREIGN PATENTS 598,636  2/1948  Great Britain.

MILTON BUCHLER, Primary Examiner

THOMAS W. BUCKMAN, Assistant Examiner

U.S. Cl. X.R.

188—78